United States Patent
Teglas et al.

(10) Patent No.: US 11,245,537 B2
(45) Date of Patent: Feb. 8, 2022

(54) SYSTEM AND METHOD FOR A LOCAL SERVER WITH SELF-SIGNED CERTIFICATES

(71) Applicant: Open Text Corporation, Waterloo (CA)

(72) Inventors: Russell George Teglas, Arlington, MA (US); Samir Yasin Vaidya, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 271 days.

(21) Appl. No.: 16/435,016

(22) Filed: Jun. 7, 2019

(65) Prior Publication Data
US 2020/0389326 A1 Dec. 10, 2020

(51) Int. Cl.
*H04L 29/06* (2006.01)
*H04L 9/32* (2006.01)

(52) U.S. Cl.
CPC .......... *H04L 9/3265* (2013.01); *H04L 9/3268* (2013.01); *H04L 63/18* (2013.01); *H04L 2209/64* (2013.01)

(58) Field of Classification Search
CPC ..... H04L 9/3265; H04L 9/3268; H04L 63/18; H04L 2209/64; H04L 63/0442; H04L 67/02; H04L 63/0823; H04L 9/14; H04L 9/0861
See application file for complete search history.

(56) References Cited

U.S. PATENT DOCUMENTS

| | | | | |
|---|---|---|---|---|
| 10,313,136 B2* | 6/2019 | Salmi | ............ | H04L 9/321 |
| 10,425,401 B1* | 9/2019 | Pecen | ............ | H04L 9/0852 |
| 10,454,689 B1* | 10/2019 | Sharifi Mehr | ........ | H04L 63/166 |
| 10,546,047 B1* | 1/2020 | Michael | ............ | G06F 40/106 |
| 10,805,246 B1* | 10/2020 | Egles | ............ | H04L 65/607 |
| 2003/0156719 A1* | 8/2003 | Cronce | ............ | G06Q 20/3674 380/256 |
| 2008/0235507 A1* | 9/2008 | Ishikawa | ............ | H04L 63/0428 713/150 |
| 2012/0008529 A1* | 1/2012 | Averbuch | ............ | H04L 41/0806 370/255 |

(Continued)

OTHER PUBLICATIONS

Office Action for U.S. Appl. No. 16/264,061, dated May 14, 2020, 13 pgs.

(Continued)

*Primary Examiner* — Hee K Song
*Assistant Examiner* — Hassan A Hussein
(74) *Attorney, Agent, or Firm* — Sprinkle IP Law Group (57) ABSTRACT

A system comprising a processor and a computer readable memory coupled to the processor, the computer-readable memory comprising computer program code executable by the processor to generate create a self-signed certificate, create a second certificate using the set of certificate generation parameters, the second certificate linked to the self-signed certificate, store the self-signed certificate in a certificate store of a first web browser; and store the second certificate in a local server certificate store to allow a local service to use the second certificate in a handshake to establish a secure socket connection with the first web browser in compliance with a mixed content security policy of the first web browser.

21 Claims, 5 Drawing Sheets

(56) References Cited

U.S. PATENT DOCUMENTS

| | | | | |
|---|---|---|---|---|
| 2013/0145165 A1* | 6/2013 | Brown | ............ | H04L 63/18 |
| | | | | 713/176 |
| 2014/0289360 A1* | 9/2014 | Mahkovec | ............ | H04L 67/10 |
| | | | | 709/217 |
| 2014/0289510 A1* | 9/2014 | Tuch | ............ | H04L 63/102 |
| | | | | 713/156 |
| 2014/0289511 A1* | 9/2014 | Tuch | ............ | G06F 21/6281 |
| | | | | 713/156 |
| 2014/0337959 A1* | 11/2014 | Garmark | ............ | H04L 63/0807 |
| | | | | 726/9 |
| 2015/0244783 A1* | 8/2015 | Mayers | ............ | H04L 67/10 |
| | | | | 709/203 |
| 2015/0358328 A1* | 12/2015 | Kaplan | ............ | H04L 67/1095 |
| | | | | 726/6 |
| 2016/0173286 A1* | 6/2016 | Gallagher | ............ | H04L 9/321 |
| | | | | 713/156 |
| 2016/0173488 A1* | 6/2016 | Xie | ............ | H04L 9/3263 |
| | | | | 713/156 |
| 2016/0212123 A1* | 7/2016 | Koster | ............ | H04L 63/0823 |
| 2017/0012786 A1* | 1/2017 | Gallagher | ............ | H04L 9/321 |
| 2017/0031876 A1* | 2/2017 | Myers | ............ | G06F 16/972 |
| 2017/0346639 A1* | 11/2017 | Muftic | ............ | H04L 9/3263 |
| 2018/0315004 A1* | 11/2018 | Lecourtier | ............ | G06Q 10/083 |
| 2018/0322216 A1* | 11/2018 | Vaidya | ............ | G06F 8/34 |
| 2019/0199616 A1* | 6/2019 | Jones | ............ | H04L 67/32 |
| 2019/0253265 A1* | 8/2019 | Pan | ............ | H04L 9/30 |
| 2020/0252444 A1* | 8/2020 | Teglas | ............ | H04L 69/03 |
| 2020/0267185 A1* | 8/2020 | Smyth | ............ | H04L 63/168 |
| 2020/0274721 A1* | 8/2020 | Melo | ............ | H04L 9/0861 |

OTHER PUBLICATIONS

Office Action for U.S. Appl. No. 16/264,061, dated Nov. 25, 2002, 16 pgs.

* cited by examiner

SYSTEM AND METHOD FOR A LOCAL SERVER WITH SELF-SIGNED CERTIFICATES

TECHNICAL FIELD

This disclosure relates to systems and methods for extending the functionality of a web browser. Even more specifically, this disclosure relates to systems and methods for securely connecting to a local service.

BACKGROUND

"Mixed content" generally occurs when a page loaded HTTPS requires a browser to load some of the assets on the page (images, videos, stylesheets, scripts, scripts called by scripts, or other assets) via plain HTTP or other unsecured protocol. Web browsers implement mixed content security policies to block at least some types of mixed content requests or responses. The mixed content security policies of many commercial browsers, for example, prevent a web page loaded via HTTPS from making plain HTTP requests or plain WebSocket connections to a different origin. This can block a web page loaded via HTTPS from connecting to local services.

SUMMARY

Embodiments of the present disclosure provide systems and methods for extending the functionality of a browser using a local service in compliance with the browser's mixed content security policy.

One embodiment includes a processor configured to execute a first web browser and a computer-readable memory coupled to the processor, the computer-readable memory comprising computer program code executable by the processor to: generate a first private/public key pair comprising a first private key and a first public key, generate a second private/public key pair and a second private/public key pair, create a self-signed certificate using a set of certificate generation parameters, the self-signed certificate including the first public key and signed with the first private key, create a second certificate using the set of certificate generation parameters, the second certificate linked to the self-signed certificate and signed with the first private key and including the first public key, store the self-signed certificate in a certificate store of a first web browser and store the second certificate in a local server certificate store to allow a local service to use the second certificate in a handshake to establish a secure socket connection with the first web browser in compliance with a mixed content security policy of the first web browser. According to one embodiment, the self-signed certificate is a self-signed certificate authority (CA) certificate and the second certificate is a local server transport layer security (TLS) certificate.

According to one embodiment, the computer program code is further executable to: create a third certificate using the set of certificate generation parameters, where the third certificate is linked to the self-signed certificate, signed with the first private key, and includes the second public key. The computer program code can be executed to store the third certificate in the local server certificate store to allow the local service to use the second certificate in a handshake to establish a secure socket connection with a second web browser in compliance with a mixed content security policy of the second web browser. According to one embodiment, the third certificate is a TLS certificate.

According to one embodiment, the computer program code is executable to: set an issuer of the second certificate equal to a subject of the self-signed CA certificate and an issuer of the third certificate equal to the subject of the self-signed CA certificate.

According to one embodiment, the computer program code is executable to: include a loop back address or loopback address alias in a subject of the second certificate.

According to one embodiment, the computer program code is further executable to: listen on a port on the loopback address for a connection request, receive the connection request from the first web browser on the port, the connection request comprising a request for the secure socket connection with the first web browser, based on the connection request from the first web browser, participate in the handshake with the first web browser to establish the secure socket connection between the first web browser and the local service, and provide the second certificate to the first web browser for validation during the handshake.

In accordance with one aspect of the present disclosure, the computer-readable memory further comprises a web page configured to: create a client socket instance, send the connection request to the local service and receive the second certificate from the local service for validation. The computer program code can be executable to: create a server socket instance for the local service, use the server socket instance to listen on the port for the connection request and establish the secure socket connection with the client socket instance.

Another embodiment includes a method for complying with mixed content security policies. The method can include generating a first private/public key pair, the first private/public key pair comprising a first private key and a first public key, generating a second private/public key pair, the second private/public key pair comprising a second private key and a second public key, creating a self-signed certificate using a set of certificate generation parameters, the self-signed certificate including the first public key and signed with the first private key, creating a second certificate using the set of certificate generation parameters, the second certificate linked to the self-signed certificate and signed with the first private key, the second certificate including the second public key, storing the self-signed certificate in a certificate store of a first web browser, and storing the second certificate in a local server certificate store to allow a local service to use the second certificate in a handshake to establish a secure socket connection with the first web browser in compliance with a mixed content security policy of the first web browser.

According to one embodiment, the method further comprises creating a third certificate using the set of certificate generation parameters, the third certificate linked to the self-signed certificate and signed with the first private key, the third certificate including the second public key. The method can also include storing the third certificate in a local server certificate store to allow the local service to use the third certificate in a handshake to establish a secure socket connection with a second web browser in compliance with a mixed content security policy of the second web browser. According to one embodiment, the self-signed certificate is a self-signed CA certificate, the second certificate is a first TLS certificate and the third certificate is a second TLS certificate.

According to one embodiment, creating the second certificate comprises setting an issuer of the first TLS certificate equal to a subject of the self-signed CA certificate and including a loopback back address in a subject of the first TLS certificate and creating the third certificate comprises setting an issuer of the second TLS certificate is equal to the subject of the self-signed certificate authority certificate and including a loopback address alias in a subject of the second TLS certificate.

One embodiment of a method can include executing the local service to: create a server socket instance bound to a loopback address, listen on the server socket instance on a port on the loopback address for a connection request, receive the connection request for the secure socket connection from the first web browser, participate in the handshake with the first web browser to establish a first secure socket connection between a client socket instance created by the first web browser and the server socket instance and provide the second certificate to the first web browser for validation during the handshake.

According to one embodiment, the method can include processing a web page to: create a client socket instance, send the connection request for the secure socket connection to the local service using the client socket instance and receive the second certificate from the local service for validation.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure provide systems and methods for extending the functionality of a browser (or other application) using a cooperating server program. According to one embodiment, a page being rendered is configured to connect to a local service provided by instance of a server program and establish a secure socket connection with the local service. The connection provides an encrypted two-way communications channel, such as a full-duplex, bidirectional communications channel, to enable bidirectional communications between the page and the program instance. As such, the page may communicate with the program instance to pass data to be processed to the program instance and the program instance may communicate with the page to pass data to be processed to the browser or update the page as rendered to a display. The connection may be a persistent connection that, once established, remains open until the browser or the program instance closes the connection.

The local service can provide a variety of functionality not provided by the browser. By way of example, but not limitation, the local service may provide advanced content transfer and manipulation capabilities to a web page that are not provided by the browser or the HTML or JavaScript running in the web page. In some cases, the local service provides a graphical user interface (GUI) apart from the web page so that a user can use additional tools provided by the local service.

Figure 1:
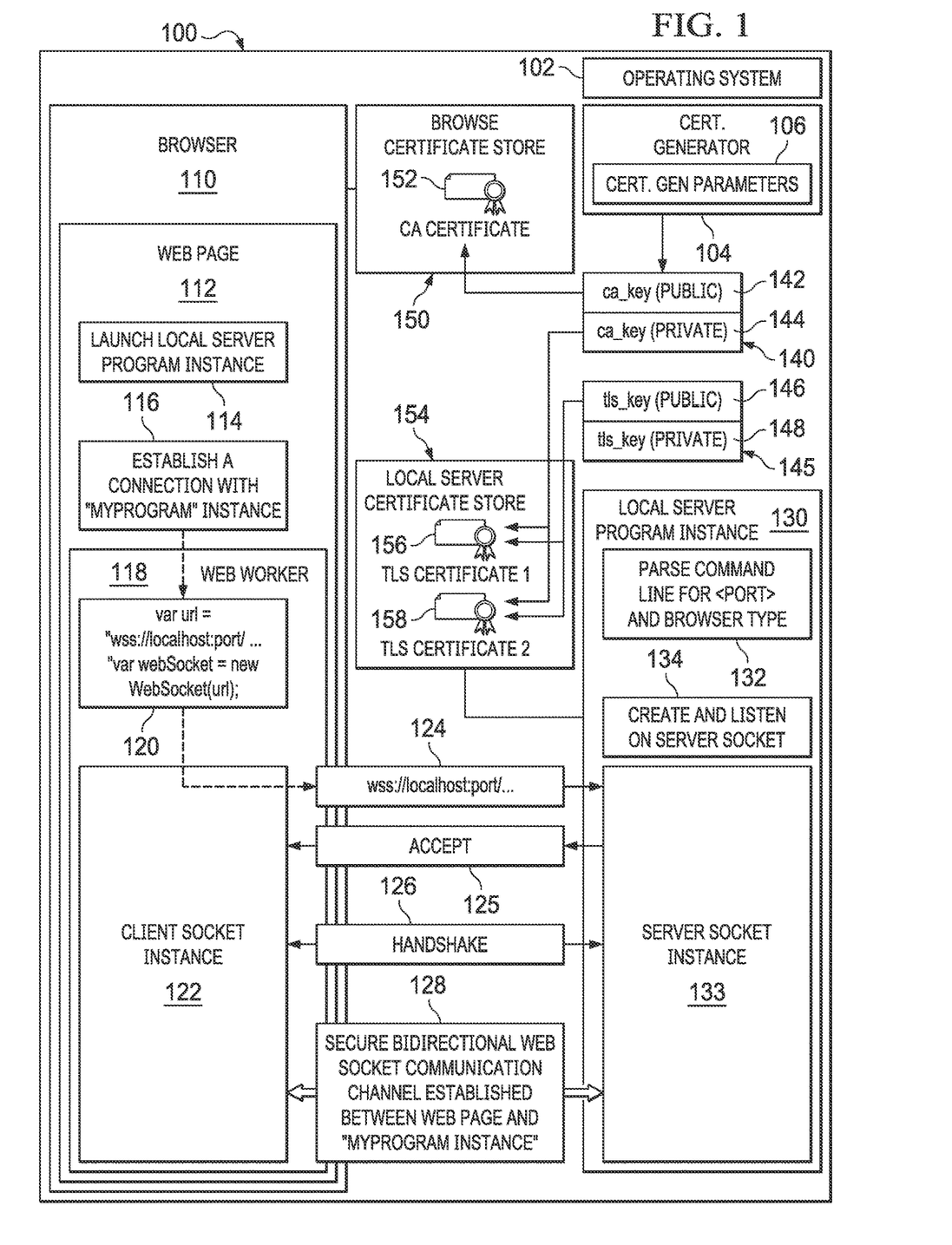
FIG. 1 is a block diagram of one embodiment of a computing device with extended browser functionality.

FIG. 1 is a block diagram of one embodiment of a computing device 100 with extended browser functionality. Computing device 100 comprises computer hardware, such as a processor to execute computer executable instructions, memory, input/output devices, and a network interface to connect to a network. Computing device 100 includes an operating system 102 configured to be executed on the processor to provide various services to programs (applications) and manage or act as an intermediary between programs and the various hardware components, a web browser 110 configured to be executed on the processor, where browser 110 may be a portion of operating system 102 in some embodiments, and a local server program (an instance 130 of which is illustrated). According to one embodiment, server program instance 130 executes on the same computing device 100 as browser 110. For example, browser 110 and server program instance 130 can execute on the same processor.

In the embodiment illustrated, browser 110 is rendering web page 112. Local server program instance 130 provides a local service to extend of browser 110 with functionality not provided by web page 112. By way of example, but not limitation, local server program instance 130 can provide a local service with advanced content transfer and manipulation capabilities not provided by the browser or the HTML or JavaScript running in web page 112.

According to one embodiment, browser 110 implements a mixed content security policy that prevents web page resources loaded via HTTPS from one origin from making HTTP requests or WebSocket connections to local services. Local server program instance 130, however, can act as a secure socket server (e.g., an HTTPS or secure WebSocket server) with which web page 112 can establish a secure connection in compliance with the mixed content security policy. Consequently, requests by a web page 112 to local server program instance 130 are not blocked by the mixed content security policy of browser 110.

A certificate generator 104 is provided to configure computer system 100 with a set of security certificates so that web page 112 can connect to local server program instance 130 in compliance with browser 110's mixed content security policy. According to one embodiment, certificate generator 104 is executed as a portion of the installer code that installs a local server program on computing device 100. Certificate generator 104 is configured with a set of certificate generation parameters 106 for generating security certificates. According to one embodiment, the set of certificate generation parameters 106 include parameters used to generate certificates according to the X.509 standards promulgated by the Telecommunication Standardization Sector of the International Telecommunication Union. Examples of certificate generation parameters 106 include, but are not limited to, key size, the country, state, locality, organization and common name associated with the creator of the local server program, common name to use in a server certificate or other parameters.

Certificate generator 104 is configured to generate a plurality of private/public key pairs and use the public/private key pairs and certificate generation parameters 106 to generate various security certificates. In the example of FIG. 1, certificate generator is configured to generate a first private/public key pair, ca_key 140, which includes ca_key (public) 142 and ca_key (private) 144, and a second private/public key pair, tls_key 145, which includes tls_key (public) 146 and tls_key (private) 148. These private/public key pairs may be generated according to any suitable cryptographic key generation algorithm. By way of example, but not limitation, certificate generator 104 generates RSA private/public key pairs of a configured key size (e.g., 2048 bits or other size). According to one embodiment, ca_key (private) is maintained only in volatile memory and is not persisted in persistent storage.

Certificate generator 104 uses public/private key pair 140 and certificate generation parameters 106 to create a self-signed certificate authority (CA) certificate 152. One embodiment of a self-signed CA certificate 152 includes the information of Table 1 for the relevant portions of the certificate.

TABLE 1

| Field | Value |
|---|---|
| subject: | Name to which certificate is issued. According to one embodiment, the name is an X.509 name that includes the country, state, locality, organization, and common name associated with creator of local server program |
| issuer: | same as subject |
| public key: | public key 142 |

Certificate generator 104 signs self-signed CA certificate 152 with private key 144 and writes self-signed CA certificate 152 to a file (for example "ca.crt") in a filesystem of computing device 100.

Certificate generator 104 also generates an SSL, TLS or other certificate as a local server certificate 156 using public/private key pair 140, public/private key pair 142 and certificate generation parameters 106. According to one embodiment, local server certificate 156 is signed with private key 144 and includes the information of Table 2 for the relevant portions of the certificate.

TABLE 2

| Field | Value |
|---|---|
| subject: | name to which certificate is issued. According to one embodiment, the name is an X.509 name that includes the country, state, locality, organization, associated with creator of local server program and a common name equal to the loopback address or a loopback address alias. |
| issuer: | equal to subject of certificate 152 |
| public key: | public key 146 |

According to one embodiment, certificate generator 104 signs local server certificate 156 with private key 144. Signing local server certificate 156 can include computing a hash of various pieces of information in the local server certificate 156 (including the value of its "subject" field) and encrypting the hash using private key 144.

As will be appreciated, some browsers will not recognize a TLS certificate having the subject's commonName equal to the loopback address (e.g., 127.0.0.1), while other browsers will not recognize a TLS certificate having a subject's commonName equal to the loopback address alias (e.g., localhost). Thus, as described in the embodiment of Table 2, certificate generator 104 can be configured to set the common name in the subject of local server certificate 156 to a loopback address or to a loopback address alias. For example, in one embodiment, certificate generator 104 is configured to set the common name in the certificate subject to the standardized loopback address (e.g., commonName="127.0.0.1"). In another embodiment, certificate generator 104 is configured to set the common name in the certificate subject to a standardized loopback address alias (e.g., commonName="localhost").

To accommodate a wide variety of browsers, one embodiment of certificate generator 104 is configured to generate a first local server certificate (e.g., local server certificate 156) with the common name in the certificate subject set to the loopback address alias (e.g., commonName="localhost") and a second local server certificate (e.g., local server certificate 158) with the common name in the certificate subject set to the loopback address (e.g., commonName="127.0.0.1"). Local server certificates 156 and local server certificate 158 each include public key 146 (tls_key (public)) and are signed with private key 144 (ca_key (private)). In another embodiment, certificate generator 104 creates an additional private/public key pair (e.g., tls_key2) for local server certificate 158 and stores tls_key2 (public) in local server certificate 158.

It can be noted that local server certificate 156 and local server certificate 158 are linked to self-signed CA certificate 152 because, for example, the issuer in local server certificates 156, 158 is equal to the source in self-signed CA certificate 152 and thus browser 110 will user CA certificate to verify local server certificates 156, 158. Once each local server certificate linked to self-signed CA certificate 152 is signed with private key 144, certificate generator 104 can discard private key 144.

To configure browser 110 with self-signed CA certificate 152, certificate generator 104 imports certificate 152 into the certificate store 150 of browser 110. Certificate store 150 includes areas of computer-readable memory referenced by browser 110 or otherwise configured for storing security certificates used by browser 110 for establishing secure connections. As will be appreciated, the location of the browser certificate store 150 depends on factors such as operating system and browser. For example, some browsers reference a root trust store provided by the operating system for a current user (e.g., the WINDOWS root trust store for a current user), while other browsers reference a file associated with a current user's profile as the browser certificate store. Certificate generator 140 can be configured to use an operating system or browser provided command line utility to import ca.crt into the browser certificate store 150 (e.g., WINDOWS root trust store for a current user, cert9.db file associated with a current user's profile or other browser certificate store).

While only one browser 110 is illustrated in FIG. 1, computer system 100 may include multiple browsers. Storing self-signed CA certificate 152 in browser certificate store 150 can include storing copies of self-signed CA certificate 152 in various locations corresponding to different types of browsers.

Certificate generator 104 further stores local server certificates and private/public key pair 145 in local server certificate store 154. Local server certificate store 154 comprises areas of computer-readable memory referenced by the local server program or otherwise configured for storing local server certificates and associated keys used by the local service (e.g., used by instance 130) for establishing secure connections. Using an example in which the local server certificate store 154 is a filesystem location referenced by the local server program, certificate generator 104 can configure the local service with local server certificate 156 and local server certificate 158 by storing local server certificate 156 as a first file (e.g., tls_lh.pem) and local server certificate 156 as a second file (e.g., tls_lb.pem) in the local server certificate store 154. The file names can be used by the local service to determine which certificate to use for a connection (e.g., based on the browser requesting the connection).

Storing local server certificates 156, 158 and key pair 145 in the local server certificate store allows a local service (e.g., local server program instance 130) to use the certificates and keys in secure socket connection handshakes. It can be noted that storing local server certificates 156, 158 and key pair 145 in local server certificate store 154 to allow the local service to use the certificates and keys in the handshakes can occur before the local service is instantiated.

Turning to local server program instance 130, local server program instance 130 launches when a desktop login session begins, in response to a user launching the program or in response to another event. According to one embodiment, server program instance 130 is launched by web page 112 as described in U.S. patent application Ser. No. 16/264,061, entitled "System and Method for Launching and Connecting to a Local Server from a Webpage," which is hereby fully incorporated herein by reference for all purposes. If server program instance 130 is launched by web page 112, operating system 102 may pass an indicator of the type of browser 110 in which web page 112 is being rendered to server program instance 130 as part of the command line arguments passed at launch.

To facilitate launching of server program instance 130 by web page 112, the local server program can be registered in a registry of operating system 102 as a handler for a custom protocol. For example, the server program "myprogram" can be registered as the handler for "myprotocol". This registration may be performed as part of installing the server program or at another time. The mechanism for registering a program to handle a protocol is operating system dependent and the server program can be registered to handle the custom protocol using the appropriate mechanism for the operating system 102. For a MICROSOFT WINDOWS operating system, for example, such registration can be recorded in a WINDOWS registry key. For instance, the following registry script is configured to register myprogram.exe to be launched when a launch request using "myprotocol" is received:

reg add HKCU\SOFTWARE\Classes\myprotocol\shelhopen\command/t REG_EXPAND_SZ/d "%LOCALAPPDATA%\Programs\myprogram\myprogram.exe\"%%1\""/f In this example, other components running on computing device 100, such as browser 110, can launch an instance of the server program (e.g., launch an instance of myprogram.exe) using a universal resource identifier (URI) such as "myprotocol:arg1". Moreover, web pages being processed by different browsers on computing device 100 can launch and connect to instances of the same installed server program.

Server program instance 130 is executable to access or receive a set of connection configuration data. According to one embodiment, server program instance 130 is configured to parse the command line arguments received from operating system 102 at launch to extract the connection configuration data. For example, as indicated at block 132, server program instance 130 parses the command line arguments to extract the port number and type of browser that launched server program instance 130. The port number indicates the port on which server program instance 130 is to listen for connection requests. Server program instance may also parse the command line arguments for a launchid as described in U.S. patent application Ser. No. 16/264,061. In another embodiment, the local server program is configured with a fixed port.

Server program instance 130 loads a local server certificate (e.g., local server certificate 156 or local server certificate 158) and associated key from local server certificate store 154. For example, in an embodiment in which server program instance is launched by web page 112 and passed an indicator of the type of browser 110, server program instance chooses the local server certificate (e.g., local server certificate 156 or local sever certificate 158) that is compatible with browser 110. In another embodiment, the server program may be configured with the name of a certificate to use.

Server program instance 130 listens for connection requests according to the connection configuration data. In some embodiments, the connection configuration data is static and server program instance 130 listens on a fixed port number for connection requests. In another embodiment, the connection configuration data includes, for example, a dynamically determined port, a launchid (e.g., as described in U.S. patent application Ser. No. 16/264,061) or other connection configuration data.

At block 134, server program instance 130 creates a server socket instance 133. In accordance with one embodiment, server socket instance 133 is an object instance, such as a WebSocket instance, that represents an end-point for sending or receiving data. Server program instance 130 binds the server socket instance 133 to a port on the loopback address of computing device 100 (typically the IP address 127.0.0.1) or otherwise binds server socket instance 133 to the local host. For example, if the set of configuration data indicates that port 23845 is to be used, server program instance 130 binds server socket instance 133 to 127.0.0.1: 23845.

Server program instance 130 is configured to listen for connection requests on the port (e.g., 127.0.0.1:23845) using server socket instance 133. When server program instance 130 receives a connection request, such as connection request 124, on the designated port, server program instance 130 determines whether to accept or reject the request. Server program instance 130 may implement a variety of rules to determine whether to allow or deny connections. As one example, server program instance 130 may allow or deny a request based on a launchid received in the request. As another example, server program instance 130 may allow or deny connections based on an origin.

As will be appreciated, when a browser loads a JavaScript resource for a web page from a web site (typically but not necessarily the from the same web site that served the markup language file for the web page), the browser can remember the host associated with the JavaScript as the JavaScript's origin. Whenever a browser makes HTTP request using the XmlHttpRequest or fetch API or makes a WebSocket connection request using the WebSocket constructor, the browser can send an origin request header indicating the origin of the web site from which the JavaScript that is making the request was downloaded whenever this origin differs from that of the web page file (e.g., HTML file or other file) that caused the browser to load the JavaScript. That is, when the browser sends a cross-origin request, the browser includes the origin of the JavaScript that caused the request to be sent in an origin header of the cross-origin request. To prevent web scripts served from unwanted origins from launching and/or connecting to the server program, the server program can be configured with a white list of trusted origins. When a connection request is encountered with an unknown origin, the server program instance can either prompt the user and ask whether the origin should be trusted or reject the request if its origin is not in the white list. In addition or in the alternative, the server program may be provided with a blacklist of origins such that server program instance 130 denies connection requests containing blacklisted origins.

If server program instance 130 does not reject the request, server program instance can accept the request, as indicated at 125, and engage in a handshake 126 to establish a secure connection 128 (e.g., an HTTPS connection, a secure WebSocket (WSS) connection or other secure application layer socket connection). As part of the handshake, server program instance 130 provides the local server certificate (e.g., local server certificate 156 or local server certificate 158 loaded for the connection) to browser 110 for validation. Because local server certificate 156 and local server certificate 158 are linked to self-signed CA certificate 152, browser 110 will select self-signed CA certificate 152 from browser certificate store 150 to validate local server certificate 156 or local server certificate 158.

Browser 110 validates local server certificate 156 or local server certificate 158 by verifying that it has been signed by the certificate authority that issued the certificate. For example, browser 110 computes a hash of various pieces of information in the local server certificate 156 or local server certificate 158 (including the value of its "subject" field), uses the public key 142 from self-signed CA certificate 152 to decrypt a hash of this same information for the digital signature of local server certificate 156 or local server certificate 158 (e.g., as part of the signature) and checks if the two hashes are the same. Browser 110 will also verify that the subject local server certificate 156 or local server certificate 158 matches the hostname of the server presenting local server certificate 156 or local server certificate 158. If browser 110 validates local server certificate 156, the handshake continues. The handshake may include, for example, generating symmetric keys based on the local server public/private key pair 145.

As discussed above FIG. 1 illustrates browser 110 rendering web page 112. Rendering web page 112 may include browser 110 executing on a processor to process HTML or other markup language, and related resources, such as scripts, style sheets, image files, video files, audio files or other resources, potentially retrieved from multiple network locations, that are processed by browser 110 to render web page 112. Web page 112 may comprise instructions (e.g., HTML, JavaScript or other instructions) interpretable or executable by the browser 110 to implement various functionality. Thus, web page 112 can be said to perform various operations, such as connecting to a local service (e.g., connecting to local server program instance 130) of the server program, communicating with the local service or other performing other operations.

As will be appreciated by the skilled artisan, many browsers implement single threaded rendering engines, such that all (or most) rendering operations on a web page are executed in a single thread. Examples of such rendering operations typically include, but are not limited to, parsing HTML (or other markup language) into a DOM and executing scripts embedded in or referenced by the markup language. In some embodiments, at least a portion of the instructions of web page 112 can be configured to be interpreted or executed in another thread from the main web page thread. For example, web page 112 can be configured so that the connection with server program instance 130 is created or maintained by a separate thread from the main web page thread so that creating or maintaining the connection does not block processing of the markup language or other scripts, such as UI scripts, executed in the main web page thread.

According to some embodiments, web page 112 can be configured to launch program instance 130. Web page 112, as indicated by block 114, may include instructions executable by browser 110 to generate a launch request to operating system 102 to cause operating system 102 to launch instance 130 of the server program. According to one embodiment, web page 112 is configured to automatically send the launch request as browser 110 is loading page 112. In another embodiment, web page 112 is configured to generate the launch request responsive to user interaction with the displayed web page after the web page has loaded. The launch request indicates the program to be launched (e.g., by indicating the custom protocol or otherwise indicating the program to be launched) and arguments. In some embodiments the arguments in the launch request may include the type of browser 110, a port and a launchid. The port and launchid can be determined as described in U.S. patent application Ser. No. 16/264,061.

The mechanism for a web page to launch a server program may be browser dependent. As one example, web page 112 can be executable to generate a statement such as:

window.location.href=myprotocol:23845:agdx3ofpmbs;

which will cause certain browsers to request that the operating system 102 launch an instance of the program associated with "myprotocol" and pass the arguments to the instance as command line arguments. As will be appreciated, the foregoing is provided by way of example and not limitation and the instructions for generating launch request using the custom URI (or other launch request) can be configured as appropriate for the browser to which page 112 is served.

Web page 112 includes instructions for establishing a connection, such as an application layer socket connection, with server program instance 130. According to one embodiment, the connection is established using a different thread from the main web page thread. For example, as represented at block 116, web page 112 can be configured to launch a web worker 118 that includes instructions executable to connect to server program instance 130 as a client. The first thread (e.g., the main web page thread) and web worker 118 can communicate with each other asynchronously using web worker application program interfaces (API) (e.g., window-.postMessage/window.onmessage javascript API). In some embodiments, the first thread is configured to pass connection data to web worker 118. The connection data includes, according to one embodiment, the port number for establishing a connection to local server program instance 130. In some embodiments, the connection data further includes a launchid that can be used by server program instance 130 to verify that web page 112 is permitted to connect to server program instance 130.

Web worker 118 is executable to create a connection with server program instance 130. At block 120, web worker 118 is configured to compose a set of socket configuration information that is used to create a socket instance. For example, at block 120, web worker 118 composes a URI, such as a URL, that will be used to connect to server program instance 130. The URI may include a host name or address and a set of connection data, such as a port and launchid. For example, web worker 118 can be configured to compose the URI by inserting a port. For example, the URI wss://localhost<port>/ . . . .

Web worker 118 uses the set of socket configuration information to create a client socket instance 122, which can be an object instance that represents an end-point for sending or receiving data. According to one embodiment, web worker 118 uses a WebSocket constructor to create the new WebSocket instance using the URI. As will be appreciated, web worker 118 first establishes a transport layer connection (e.g., a TCP connection) with server program instance 130. When the TCP connection is established, web worker 118 sends a connection request 124 to establish an application layer socket connection with server program instance 130, where the connection request 124 is in a format known to server program instance 130. According to one embodiment, connection request 124 comprises an HTTPS upgrade request to upgrade to a secure WebSocket connection. For example, if <port>=23845, web worker 118 may generate an upgrade request, such as:

GET wss://localhost:23845/HTTPS/1.1
Origin: http://example.com
Connection: Upgrade
Host: localhost
Upgrade: websocket If connection request 124 is accepted as indicated at 125, the server program instance 130 and web page may engage in a handshake 126 to create a secure-bidirectional communication connection 128. For example, the server program instance 130 and web worker 118 engage in a TLS/SSL handshake. If the handshake completes successfully, the connection 128 is secure because cryptography is used to encrypt data transmitted across the channel. Web worker 118 can be configured to notify the main web page thread (or other thread) that secure connection 128 has been established.

Other components of web page 112 (for example, scripts executing in the main web page thread or other thread) may pass data to web worker 118 and web worker may communicate the data to server program instance 130 using client socket instance 122. Similarly, web worker 118 can pass data received via connection 128 to other components.

Web page 112 and server program instance 130 can be configured to provide a wide degree of functionality depending on implementation. As just one example, web page 112 may be configured to provide a UI that allows a user to browse, select and view files stored on a remote server and the server program may be configured to download files and provide advanced content editing functionality. In this example, web page 112 may be configured to launch server program instance 130 based on user interaction with the rendered web page (for example selection of a file) and launch web worker 118 to connect to server program instance 130. When the main web page thread receives an indication that the secure connection between client socket instance 122 and server socket instance 133 has been established, the main web page thread can pass the selected file identification to web worker 118 via the web worker API and web worker 118 can pass the file identification to server program instances via connection 128. As server program instance 130 downloads the file, server program instance 130 can pass messages indicating the download progress of the file to web worker 118 via connection 128 and web worker 118 can pass the messages to the main web page thread via the web worker API. In this example, web page 112 may include user interface scripts executable to display the download progress in the display of rendered web page 112. Server program instance 130 may provide its own UI, separate from web page 112, with tools to allow a user to edit the file or perform other operations on the file.

In some embodiments, the port number on which server program instance 130 listens is a random port number. In other embodiments, the port number is fixed. If the fixed port number is the default port number for a protocol, the port number may be implied in connection request 124 based on the protocol used or specified in the connection request.

In some embodiments, web page 112 is configured to connect to server program instance 130 in the main web page thread. Establishing the connection using a second thread (e.g. for example using a web worker), however, can prevent the processing associated with establishing the connection from blocking execution of the main web page thread and, in particular, prevent blocking of UI scripts that are not dependent on establishing the connection.

Further, while embodiment of FIG. 1 illustrates a web browser 110 rendering a web page 112, this is merely illustrative. Other embodiments of a computing device may comprise other types of page processing code, such as mobile applications or other applications configured to process pages. A page can be provided to the page processing code, where the page is processable by the page processing code to connect to a server program instance as described herein.

Figure 2:
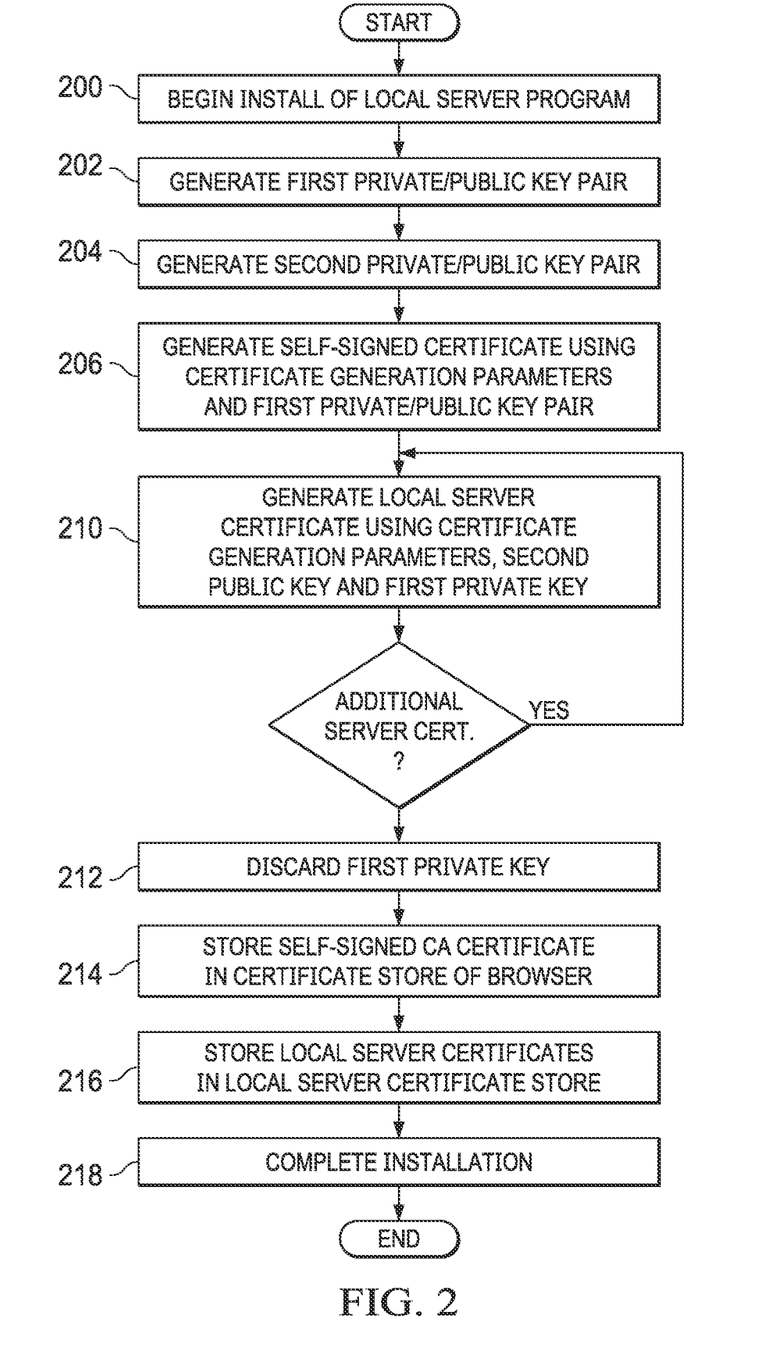
FIG. 2 is a flow chart of one embodiment of a method for configuring a computing device such that a local service can comply with a browser's mixed content security policy.

FIG. 2 is a flow chart of one embodiment of a method for configuring a computing device such that a local service can comply with a browser's mixed content security policy. According to one embodiment, the computing device 100 can be configured by the installer code for a local server program, where the local server program, when installed, is executable to provide the local service. As such, at step 200, installation of the server program begins. Although not shown, installation can include registering the server program with the operating system of a computing device as a protocol handler for a protocol.

At steps 202 and 204, a certificate generator generates a first private/public key pair and a second private/public key pair. In FIG. 1, for example, certificate generator 104 generates ca_key 140 and tls_key 145. According to one embodiment, the first private key is maintained only in volatile memory and is not persisted in persistent storage.

At step 206, the certificate generator generates a self-signed certificate authority (CA) certificate (e.g., an X.509 CA certificate). According to one embodiment, the self-signed CA certificate subject includes the country, state, locality, organization, and common name associated with the creator of the local server program being installed. The self-signed CA certificate further includes the public key of the first private/public key pair. The certificate generator signs the self-signed CA certificate with the private key of the first private/public key.

At step 210, the certificate generator generates a local server certificate that can be validated using the self-signed CA certificate. According to one embodiment, the local server certificate is an X.509 TLS certificate with a subject that includes the country, state, locality, organization associated with the creator of the local server program being installed and a common name set a loopback address or alias for the loopback address. The issuer of the local server certificate is set to the subject of the self-signed CA certificate. The local server certificate includes the public key from the second private/public key pair and is signed with the private key of the first private/public key. In some embodiments, step 210 is repeated to generate additional local server certificates. For example, step 210 can be repeated to generate server certificates having different common names in the certificate subjects.

When all the certificates to be signed with the first private key are generated, for example, once all the certificates linked to the self-signed CA certificate signed with the private key are generated, the certificate generator discards the first private key (step 212).

At step 214, the certificate generator stores the self-signed CA certificate in the certificate store of locally installed browsers or other page processing code and stores the local server certificates and second public/private key pair in a certificate store referenced by the local server program (step 216). Installation of the local server program is completed at step 218.

FIG. 2 is merely an illustrative and the disclosed subject matter is not limited to the ordering of or number of steps illustrated. Embodiments may implement additional steps or alternative steps, omit steps, or repeat steps.

Figure 3:
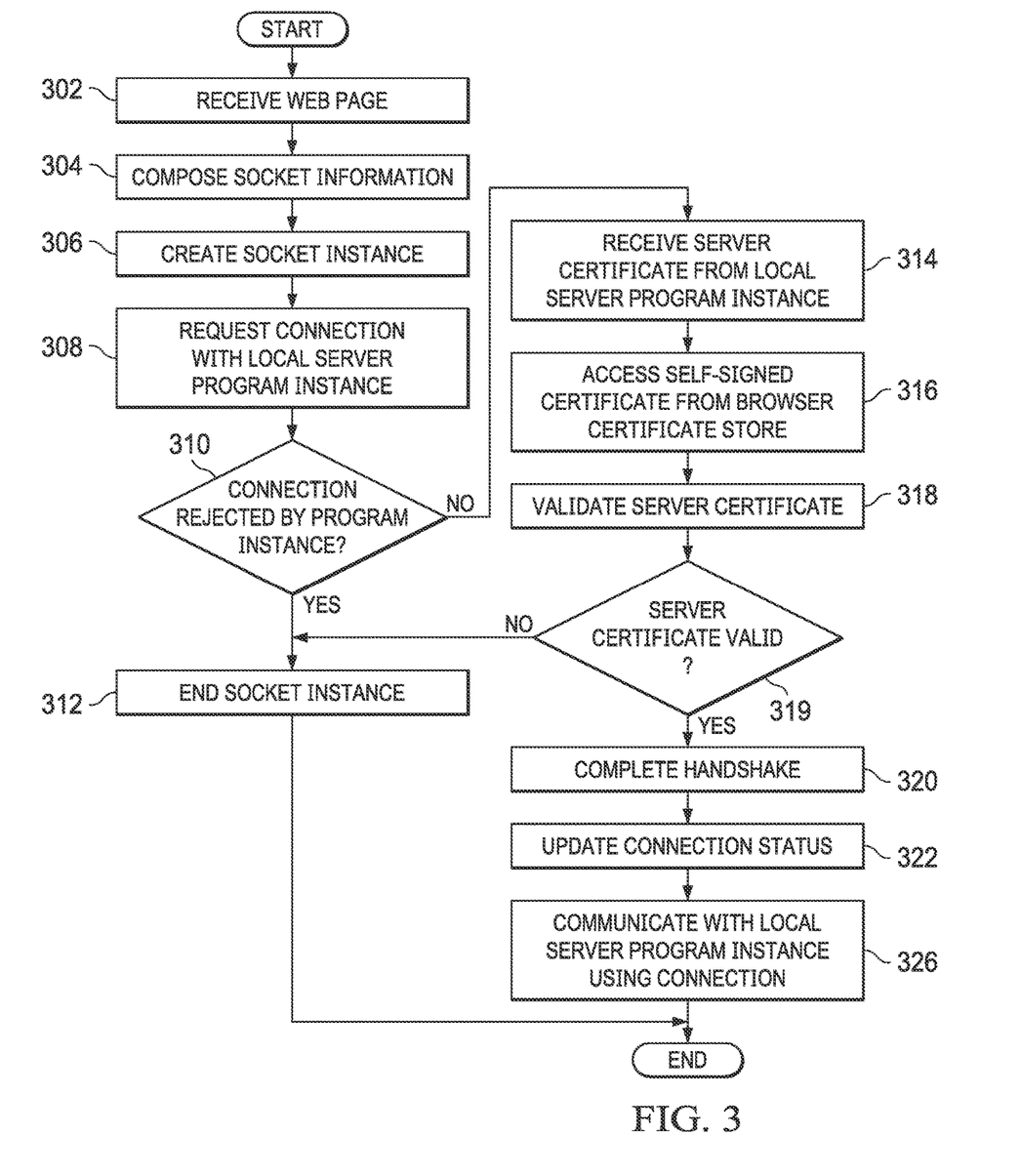
FIG. 3 is a flow chart of one embodiment of a method for connecting to a local service.

FIG. 3 is a flow chart of one embodiment of a method for connecting to a local service. In various embodiments, the method of FIG. 3 may be implemented by page processing code processing a page. For example, FIG. 3 may be implemented by web browser 110 processing web page 112. Some steps may be performed by the page; that is, some steps may be performed through interpretation or execution of instructions of the page by the page processing code. In various embodiments, one or more steps of FIG. 3 may be performed in a thread that is independent of a main thread that is rendering the page. For example, one or more steps of FIG. 3 may be performed by a web worker that executes in a different thread than a main web page thread of a browser that is rendering a web page.

At step 302, page processing code receives and begins rendering of a page. For example, web browser 110 receives and renders web page 112. Receiving and rendering the page may include, for example, receiving and processing an initial page file, such as a file containing markup language (e.g., HTML) and, in some cases, embedded scripts, and receiving and processing resources referenced in the initial page file, such as style sheets, scripts, images, videos. The page being rendered can be configured to launch and connect to an instance of a server program (e.g., program server instance 130).

In some embodiments, the page is executed to generate a request (e.g., launch request) to the operating system of the computing device to launch an instance of the server program. For example, the page may be configured to compose a custom URI having the form myprotocol:port: . . . and use the custom URI to launch an instance of the server program (e.g., to launch instance 130).

At step 304, the page is executed to compose a set of socket information that is used in creating a socket instance (socket) as an endpoint for communicating with the server program instance. According to one embodiment, the page is configured to compose a URI, such as a URL, that will be used to connect to server program instance 130. The URI may include a host name or address and a set of connection data (connection request connection data). For example, the URI may be composed by inserting a port number into the URI wss://localhost<port>/ . . . . Further, the URI may include a launchid. Using the example in which <port>=23845 and <launchid>=agdx3ofpmbs, the page can compose the URI: wss://localhost:23845/?launchId=agdx3ofpmbs.

At step 306, the page is executed to create a client socket instance, such as client socket instance 122, representing an endpoint for communicating with the server program instance. As will be appreciated, the client socket instance may be an object that represents an end-point for sending or receiving data. According to one embodiment, a WebSocket constructor is used create a new WebSocket instance using the URL to which to connect. For example, a WebSocket constructor may be used to create a new WebSocket instance using the URL ws://localhost:23845/?launchId=agdx3ofpmbs.

At step 308, a connection request, such as connection request 124, is sent by the page to the server program instance using the client socket instance, where the connection request is in a format known to server program instance. According to one embodiment, the connection request comprises an HTTPS upgrade request to upgrade to a WSS connection.

At step 310, a determination is made if the connection request was accepted by the server program instance. For example, it is determined if the server program instance returned an appropriate response indicating that the connection is accepted. If the connection is rejected by the server program instance, the client socket instance is terminated (step 310). Otherwise, the page engages in an secure socket handshake with the local server program instance. As part of the handshake, the page receives a server certificate from the local server instance (step 314). The page processing code is executed to read the issuer of the server certificate and access a self-signed certificate from the browser certificate store, where the self-signed certificate is linked to the server certificate (step 316). For example, a web browser loads a self-signed CA certificate having a subject equal to the issuer of a local server TLS certificate.

At step 318, the page processing code validates the local server certificate using the self-signed certificate. Thus, the page processing code can determine if the local server certificate is valid (step 319). If the local server certificate is not valid, the socket connection is terminated (step 312). If the page processing code determines that the server certificate is valid, the page completes the handshake (e.g., the SSL, TLS handshake) (step 320) with the local server program instance and updates the connection status (step 322). At step 326, the page and server program instance can communicate using the secure connection between the client socket instance and the server socket instance. According to one embodiment, the connection is a persistent connection that remains open until terminated by the page or server program instance.

As indicated above, one or more steps of FIG. 3, may be implemented in a different thread from the main thread rendering the page. According to one embodiment, the page can be executed to launch a second thread in which code to perform one or more steps is executed. More particularly, a page can be executed to launch a web worker. One or more of steps may be performed by the web worker. According to one embodiment, the web worker continues to execute until the client socket instance is terminated.

FIG. 3 is merely an illustrative example and the disclosed subject matter is not limited to the ordering of or number of steps illustrated. Embodiments may implement additional steps or alternative steps, omit steps, or repeat steps.

Figure 4:
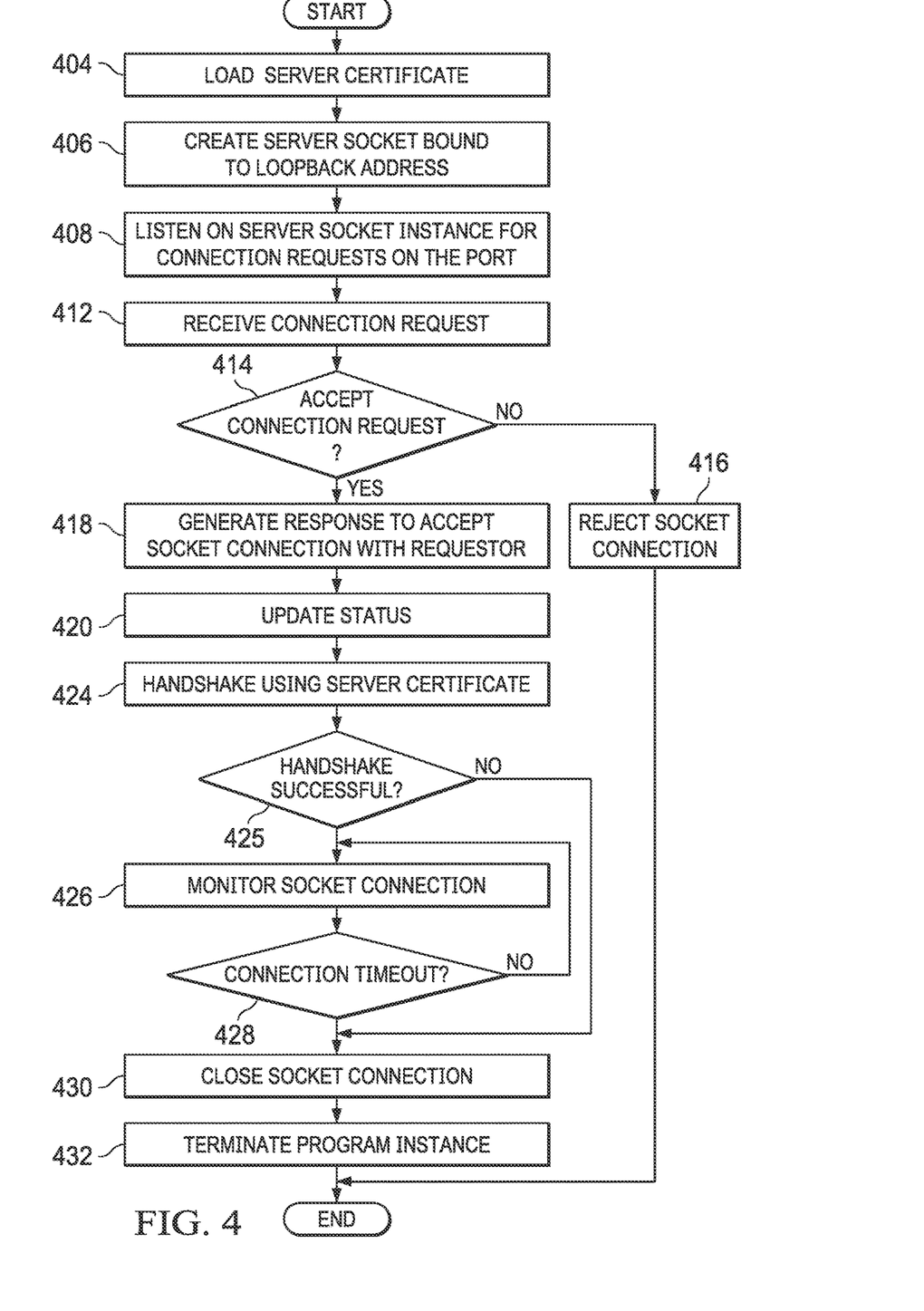
FIG. 4 is a flow chart of one embodiment of a local server-side method for establishing a connection between a page and a local service.

FIG. 4 is a flow chart of one embodiment of a local server-side method for establishing a connection between a page and a local service. In various embodiments, the method of FIG. 4 may be performed by a program configured to act as a server, such as by server program instance 130 of FIG. 1.

The server program instance can be configured with a set of connection configuration data that is used to create a connection with a page. According to one embodiment, the connection configuration data may be a set of connection data generated by the page and passed to the server program instance when the instance is launched. For example, the operating system (e.g., operating system 102) can pass the connection configuration data to the server program instance as command line parameters when the server program instance is launched, and the server program instance can parse the command line parameters to extract the connection configuration data. According to one embodiment, the operating system can pass a port number, launchid and indicator of a type of browser to the server program instance and the server program instance can parse the received command line arguments for a port number, a connection configuration launchid and browser type.

At step 404, the server program instance loads a local server certificate from a local server certificate store. According to one embodiment, the server program instance loads the certificate compatible with a browser that launched the server socket instance. In another embodiment, the server socket instance may be hard configured to load a certificate having a particular name or otherwise be configured to load a certificate.

At step 406, the server program instance creates a server socket instance (e.g., server socket instance 133), such as a server Websocket instance, and binds the server socket instance to a port. According to one embodiment, the server program instance binds the server socket instance to the port on the loopback address of a computing device (e.g., computing device 100) or otherwise binds the server socket instance to the local host. The port number of the port to which the server socket instance is bound may be a port number included in the connection configuration data received by the server program instance. In another embodiment, the server program may be configured with a fixed port. Using the example port number 23845, server program instance 130 of FIG. 1 may bind server socket instance 133 to 127.0.0.1:23845. At step 408, the server program instance listens on the server socket instance for connection requests on the given port.

The server program instance receives a connection request on the port (step 412), where the connection request is of a known format. At step 414, the server program instance determines whether to accept the connection request. According to one embodiment, the server program instance parses the connection request for connection data such as a launchid, origin in a cross-origin request or other data. The server program instance compares connection data received in the connection request (connection request connection data) to the connection data received at launch or otherwise passed to the server program instance (connection configuration data). For example, the server program instance can compare a connection request launchid extracted from the connection request with a connection configuration launchid received at launch. If the connection data does not match, the server program instance rejects the connection (step 416). If the connection data does match—for example, if the launchids match—the server program instance can accept the connection or, in some embodiments, implement further measures to ensure the security of the connection, such as checking the origin of cross-origin request against a white or black list (e.g., as described in U.S. patent application Ser. No. 16/264,061).

At step 418, the server program instance generates a response to accept the connection and, at step 420 updates the status of the server socket instance. At step 424, server program instance participates in a secure socket connection (e.g., SSL/TLS) handshake using the local server certificate loaded at step 404. The server program instance determines if the handshake is successful (step 425). If the handshake is not successful, for example if the browser cannot validate the local server certificate, the local server instance closes the connection (step 430).

If the secure socket connection handshake is successful, the page and server program instance can then communicate over the established secure connection. According to one embodiment, the server program instance continues to monitor the secure socket connection (step 426) for messages. If no message is received over the secure connection for a predetermined amount of time, as determined at step 428, the server program instance closes the secure socket connection (step 430). In some embodiments, the server program instance terminates (step 432) once the secure connection is closed.

The steps of FIG. 4 is merely an illustrative example and the disclosed subject matter is not limited to the ordering of or number of steps illustrated. Embodiments may implement additional steps or alternative steps, omit steps, or repeat steps.

Figure 5:
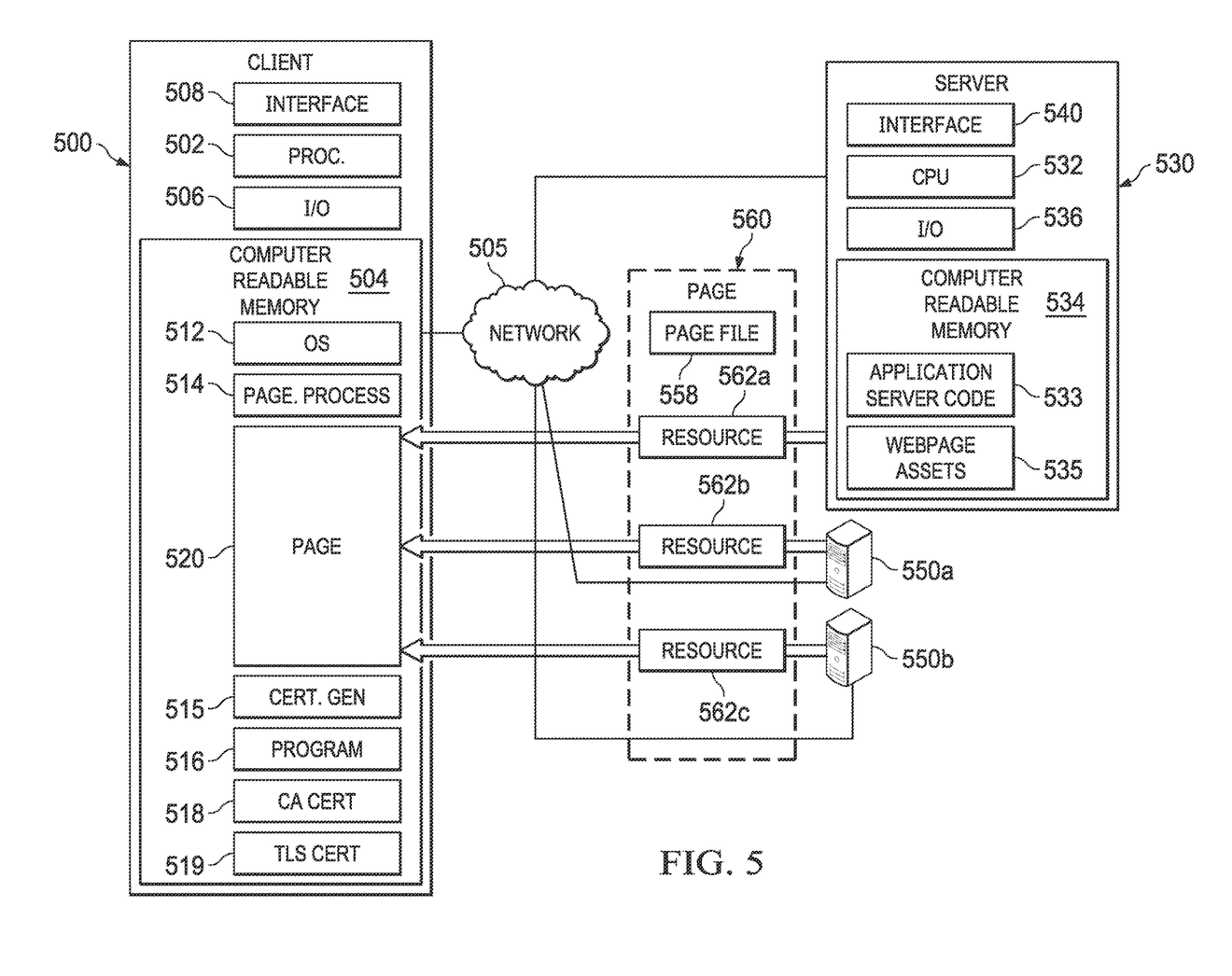
FIG. 5 is block diagram illustrating one embodiment of a distributed network system.

Embodiments of the technology may be implemented on a computing system. Any combination of mobile desktop, server machine, embedded or other types of hardware may be used. FIG. 5 is a diagrammatic representation of one embodiment of a distributed network computing environment where embodiments disclosed herein can be implemented. The computing environment includes a client computer system 500 and a server computer system 530 connected to a network 505 (e.g., a local area network (LAN), a wide area network (WAN) such as the Internet, mobile network, or other type of network or combination thereof). Network 505 can represent a combination of wired and wireless networks that network computing environment may utilize for various types of network communications. Client computer system 500 is one embodiment of a computing device 100 of FIG. 1.

Client computer system 500 includes, for example, a computer processor 502 and associated memory 504. Computer processor 502 may be an integrated circuit for processing instructions, such as, but not limited to a CPU. For example, processor 502 may comprise one or more cores or micro-cores of a processor. Memory 504 may include volatile memory, non-volatile memory, semi-volatile memory or a combination thereof. Memory 504, for example, may include RAM, ROM, flash memory, a hard disk drive, a solid-state drive, an optical storage medium (e.g., CD-ROM), or other computer readable memory or combination thereof. Memory 504 may implement a storage hierarchy that includes cache memory, primary memory or secondary memory. In some embodiments, memory 504 may include storage space on a data storage array. Client computer system 500 may also include input/output ("I/O") devices 506, such as a keyboard, monitor, printer, electronic pointing device (e.g., mouse, trackball, stylus, etc.), or the like. Client computer system 500 may also include a communication interface 508, such as a network interface card, to interface with network 505.

Memory 504 stores instructions executable by processor 502. For example, memory 504 includes an operating system 512, a page processing program 514 (e.g., a web browser or other program capable of rendering pages), certificate generator 515 and a server program 516 configured to extend the functionality of page processing program 514. In some embodiments, certificate generator 515 can be a portion of the installation code for installing server program 516. Certificate generator 515, which can be one embodiment of certificate generator 104, can generate a self-signed CA certificate 518 and store the self-signed CA certificate in a certificate store of page processing program 514. Further, certificate generator 515 can generate a TLS certificate 519 linked to self-signed CA certificate 518 and store TLS certificate 519 in a certificate store of server program 516.

Further, memory 504 can be configured with a page 520 processable (e.g., capable of being rendered by) by page processing program 514. Page 520 can be the local representation of a page 560, such as a web page, retrieved from the network environment. As will be appreciated, during rendering the page 520, page processing program 514 may request related resources, such as style sheets, image files, video files, audio files and other related resources as the page is being rendered and thus, code and other resources of page 560 may be added to page 520 as it is being rendered. Page 520 can represent one embodiment of web page 112.

Server computer system 530 includes, for example, a computer processor 532 and associated memory 534. Computer processor 532 may be an integrated circuit for processing instructions. For example, processor 532 may comprise one or more cores or micro-cores of a processor. Processor 532 may comprise a CPU. Memory 534 may include volatile memory, non-volatile memory, semi-volatile memory or a combination thereof. Memory 534, for example, may include RAM, ROM, flash memory, a hard disk drive, a solid state drive, an optical storage medium (e.g., CD-ROM), or other computer readable memory or combination thereof. Memory 534 may implement a storage hierarchy that includes cache memory, primary memory or secondary memory. In some embodiments, memory 534 may include storage space on a data storage array. Server computer system 530 may also include I/O devices 536.

Server computer system 530 may also include a communication interface 540, such as a network interface card, to interface with network 505.

Memory 534 stores instructions executable by processor 532. For example, memory 534 includes an operating system and application server code 533. Application server code 533 is executable to receive requests from client computers, such as client computer system 500, generate or server page files from a set of page assets 535 (e.g., complete web pages, page fragments, scripts or other assets) and return page files in response. A page file can reference additional resources, such as style sheets, images, videos, audio, scripts or other resources at server computer system 530 or at other network locations, such as at additional server systems (additional server system 550a and additional server system 550b are illustrated).

According to one embodiment, the network environment comprises a page 560, such as configured to launch and connect to an instance of server program 516. Page 560 may include a page file 558 containing page code (HTML or other markup language, scripts or code), stored or generated by server computer system 530, that references resources (e.g., resources 562a, 562b, 562c) at server computer system 530 or other network locations, such as additional server systems (e.g., additional server system 550a, additional server system 550b). Page file 558 or a related resource (e.g., resource 562a, resource 562b, resource 562c) can include scripts or other code executable to launch and connect to an instance of server program 516. In some embodiments, page processing program 514 loads page file 558.

According to one embodiment, page processing program 514 is executable by processor 502 to request a page from server computer system 530 via HTTPS. Responsive to the request, application server code 533 can return page file 558 for a page 560. Page processing program 514 can receive page file 558, store HTML, markup language or other page instructions from page file 558 as page 520 and begin rendering page 520. During rendering, page processing program 514 can request related resources (e.g., resources 562a, 562b, 562c) from server computer system 530 or additional server systems (e.g., additional server system 550a, additional server system 550b). As resources are returned, instructions can be added to page 520 and page processing program 514 can continue to render page 520—or put another way, render page 560—until the page is fully rendered or another event occurs. Page 520 can be configured to launch and connect to an instance of server program 516 to provide additional functionality.

According to one embodiment, page 520 can be configured to establish a secure application layer connection with an instance of server program 516. As such, page processing program 514 and the instance of server program 516 can engage in a handshake in which the instance of server program 516 provides TLS certificate 519 to page processing program 514 for validation and page processing program 514 validates TLS certificate 519 using self-signed CA certificate 518.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
   a processor configured to execute a first web browser;
   a computer-readable memory coupled to the processor, the computer-readable memory comprising installer code for installing a local server program, the installer code executable by the processor to:
   generate a first private/public key pair comprising a first private key and a first public key;
   generate a second private/public key pair comprising a second private key and a second public key;
   create a self-signed certificate using a set of certificate generation parameters, the self-signed certificate including the first public key and signed with the first private key;
   create a second certificate using the set of certificate generation parameters, the second certificate linked to the self-signed certificate and signed with the first private key, the second certificate including and the first public key;
   store the self-signed certificate in a certificate store of the first web browser;
   store the second certificate in a local server certificate store; and
   install the local server program, wherein the local server program is executable to provide a local service that is executable to:
   receive a connection request originating from a web page at the first web browser, the connection request comprising a request for a secure socket connection with the first web browser; and
   use the second certificate in a handshake to establish the secure socket connection with the first web browser in compliance with a mixed content security policy of the first web browser, including providing the second certificate to the first web browser for validation using the self-signed certificate.

2. The system of claim 1, wherein
the installer code is further executable to:
   create a third certificate using the set of certificate generation parameters, the third certificate linked to the self-signed certificate and signed with the first private key, the third certificate including the second public key; and
   store the third certificate in the local server certificate store; and
wherein the local service is executable to participate in a handshake with a second web browser to establish a secure socket connection with the second web browser in compliance with a mixed content security policy of the second web browser, including providing the third certificate to the second web browser for validation.

3. The system of claim 1, wherein the self-signed certificate is a self-signed certificate authority certificate and the second certificate is a local server TLS certificate.

4. The system of claim 3, wherein the computer program code is executable to set an issuer of the local server TLS certificate equal to a subject of the self-signed certificate authority certificate.

5. The system of claim 3, wherein the computer program code is executable to include a loopback address or a loopback address alias in a subject of the local server TLS certificate.

6. The system of claim 1, wherein the local service is further executable to:
listen on a port on a loopback address for the connection request;
receive the connection request from the first web browser on the port; and
based on accepting the connection request from the first web browser, participate in the handshake with the first web browser to establish the secure socket connection between the first web browser and the local service.

7. The system of claim 6, wherein:
the computer-readable memory further comprises the web page, wherein the web page is configured to:
create a client socket instance;
send the connection request to the local service; and
receive the second certificate from the local service for validation;
the local service is executable to:
create a server socket instance;
use the server socket instance to listen on the port for the connection request; and
establish the secure socket connection with the client socket instance.

8. The system of claim 1, wherein the secure socket connection is a secure WebSocket connection.

9. A computer program product comprising a non-transitory computer readable medium storing installer code for installing a local server program, the installer code executable by a processor to:
generate a first private/public key pair comprising a first private key and a first public key;
generate a second private/public key pair comprising a second private key and a second public key;
create a self-signed certificate using a set of certificate generation parameters, the self-signed certificate including the first public key and signed with the first private key;
create a second certificate using the set of certificate generation parameters, the second certificate linked to the self-signed certificate and signed with the first private key, the second certificate including the second public key;
store the self-signed certificate in a certificate store of a first web browser;
store the second certificate in a local server certificate store; and
install the local server program, wherein the local server program comprises computer program code executable by the processor to provide a local service that is executable to:
receive a connection request originating from a web page at the first web browser, the connection request comprising a request for a secure socket connection with the first web browser; and
use the second certificate in a handshake to establish secure socket connection with the first web browser in compliance with a mixed content security policy of the first web browser, including providing the second certificate to the first web browser for validation using the self-signed certificate.

10. The computer program product of claim 9, wherein:
the installer code is executable to:
create a third certificate using the set of certificate generation parameters, the third certificate linked to the self-signed certificate and signed with the first private key, the third certificate including the second public key; and
store the third certificate in the local server certificate store; and
the local service is executable to use the second certificate in a handshake to establish a secure socket connection with a second web browser in compliance with a mixed content security policy of the second web browser, including sending the third certificate to the second web browser for validation.

11. The computer program product of claim 9, wherein the self-signed certificate is a self-signed certificate authority certificate and the second certificate is a local server TLS certificate.

12. The computer program product of claim 11, wherein the computer program code is executable to set an issuer of the local server TLS certificate equal to a subject of the self-signed certificate authority certificate.

13. The computer program product of claim 12, wherein the computer program code is executable to include a loopback address or loopback address alias in a subject of the local server TLS certificate.

14. The computer program product of claim 9, wherein the local service is further executable to:
listen on a port on a loopback address for the connection request;
receive the connection request from the first web browser on the port; and
based on accepting the connection request from the first web browser, participate in the handshake with the first web browser to establish the secure socket connection between the local service and the first web browser.

15. The computer program product of claim 14, wherein:
the non-transitory computer readable medium further comprises the web page, wherein the web page is configured to:
create a client socket instance;
send the connection request for the secure socket connection to the local service; and
receive the second certificate from the local service for validation;
the local service is further executable to:
create a server socket instance for the local service, the server socket instance bound to the loopback address;
use the server socket instance to listen for the connection request; and
participate in the handshake to establish the secure socket connection between the client socket instance and the server socket instance.

16. The computer program product of claim 9, wherein the secure socket connection is a secure WebSocket connection.

17. A method for complying with mixed content security policies comprising:
installing a local server program, wherein installing the local server program comprises:
generating a first private/public key pair, the first private/public key pair comprising a first private key and a first public key;
generating a second private/public key pair, the second private/public key pair comprising a second private key and a second public key;
creating a self-signed certificate using a set of certificate generation parameters, the self-signed certificate including the first public key and signed with the first private key;
creating a second certificate using the set of certificate generation parameters, the second certificate linked to the self-signed certificate and signed with the first private key, the second certificate including the second public key;
storing the self-signed certificate in a certificate store of a first web browser;
storing the second certificate in a local server certificate store;
executing the local server program to provide a local service;
receiving, by the local server program, a connection request originating from a web page at the first web browser, the connection request comprising a request for a secure socket connection with the first web browser; and
using, by the local service, the second certificate in a handshake to establish the secure socket connection with the first web browser in compliance with a mixed content security policy of the first web browser, including providing the second certificate to the first web browser for validation using the self-signed certificate.

18. The method of claim 17, further comprising:
during installation of the local server program, creating a third certificate on using the set of certificate generation parameters, the third certificate linked to the self-signed certificate and signed with the first private key, the third certificate including the second public key; and
storing the third certificate in the local server certificate store;
using, by the local service, the third certificate in a handshake to establish a secure socket connection with a second web browser in compliance with a mixed content security policy of the second web browser, including providing the third certificate to the second web browser for validation;
wherein the self-signed certificate is a self-signed certificate authority certificate, the second certificate is a first TLS certificate and the third certificate is a second TLS certificate.

19. The method of claim 18, wherein:
creating the second certificate comprises setting an issuer of the first TLS certificate equal to a subject of the self-signed certificate authority certificate and including a loopback back address in a subject of the first TLS certificate; and
creating the third certificate comprises setting an issuer of the second TLS certificate equal to the subject of the self-signed certificate authority certificate and including a loopback address alias in a subject of the second TLS certificate.

20. The method of claim 17, further comprising:
executing the local service to:
create a server socket instance bound to a loopback address;
listen on the server socket instance on a port for the connection request;
receive, on the port on the loopback address, the connection request for the secure socket connection from the first web browser; and
based on the connection request from the first web browser, participate in the handshake with the first web browser to establish a first secure socket connection between a client socket instance created by the first web browser and the server socket instance;
processing the web page to:
create the client socket instance;
send the connection request for the secure socket connection to the local service; and
receive the second certificate from the local service for validation.

21. The method of claim 17, wherein the secure socket connection is a secure WebSocket connection.

\* \* \* \* \*